United States Patent [19]
Struhsaker

[11] Patent Number: 5,923,651
[45] Date of Patent: Jul. 13, 1999

[54] INCREASING DATA THROUGHPUT IN A WIRELESS TELECOMMUNICATIONS ENVIRONMENT

[75] Inventor: Paul F. Struhsaker, Plano, Tex.

[73] Assignee: Alcatel USA Sourcing, L.P., Plano, Tex.

[21] Appl. No.: 08/780,055

[22] Filed: Dec. 23, 1996

[51] Int. Cl.$^6$ .................................................. H04B 1/38
[52] U.S. Cl. ........................ 370/342; 370/320; 370/335; 370/441; 375/200; 375/261; 375/286
[58] Field of Search .................. 370/320, 335, 370/342, 441, 206, 207, 209; 375/200, 206, 261, 286, 287

[56] References Cited

U.S. PATENT DOCUMENTS

| | | | |
|---|---|---|---|
| 5,103,459 | 4/1992 | Gilhousen et al. | 370/342 |
| 5,136,612 | 8/1992 | Bi | 375/200 |
| 5,216,692 | 6/1993 | Ling | 370/342 |
| 5,235,614 | 8/1993 | Bruckert et al. | 370/342 |
| 5,327,455 | 7/1994 | De Gaudenzi et al. | 375/261 |
| 5,442,625 | 8/1995 | Gitlin et al. | 370/342 |
| 5,471,497 | 11/1995 | Zehavi | 375/200 |
| 5,541,955 | 7/1996 | Jacobsmeyer | 375/261 |
| 5,544,167 | 8/1996 | Lucas et al. | 370/18 |
| 5,565,926 | 10/1996 | Bryan et al. | 375/261 |
| 5,734,647 | 3/1998 | Yoshida et al. | 370/335 |

FOREIGN PATENT DOCUMENTS

| | | | |
|---|---|---|---|
| 0468507 | 1/1992 | European Pat. Off. | H04B 7/005 |
| 9512943 | 5/1995 | WIPO | H04L 25/02 |

OTHER PUBLICATIONS

J. R. Treichler, et al., "Fractionally Spaced Equalizers How long should they really be?," *IEEE Signal Processing Magazine*, May, 1996, pp. 65–81.

R. Prasad, "CDMA for Wireless Personal Communications", 1996, Artech House, Boston, US, XP–002061953, Chapter 3, Sections 3.1–3.2.1, pp. 39–47.

Don J. Torrieri, "Principles of Secure Communication Systems", 1985, Artech House, Boston, US, XP–002061954, Chapter 2, Sections 2.1–2.7, pp. 85–129.

"Data Communication Over the Telephone Network. A Duplex Modem Operating at Data Signalling Rates of up to 14 400 bit/s for use on the General Switched Telephone Network and on Leased Point–to–Point 2–Wire Telephone Type Circuits", CCITT Recommendation V.32.BIS, 1991, Geneva, XP–002061952, pp. 1–22.

*Primary Examiner*—Chi H. Pham
*Assistant Examiner*—Frank Duong
*Attorney, Agent, or Firm*—Baker & Botts, L.L.P.

[57] ABSTRACT

A method is provided for increasing data throughput in a wireless telecommunications environment. The method includes the following steps: mapping a discrete bit sequence associated with a subscriber to an in-phase component and a quadrature component, the in-phase component and the quadrature component defining modulation of a radio frequency signal in phase and magnitude; and encoding the in-phase component and the quadrature component with a multiple access sequence associated with the subscriber.

19 Claims, 5 Drawing Sheets

INCREASING DATA THROUGHPUT IN A WIRELESS TELECOMMUNICATIONS ENVIRONMENT

TECHNICAL FIELD OF THE INVENTION

The present invention relates in general to telecommunications systems, and more particularly, to increasing data throughput in a wireless telecommunications environment.

BACKGROUND OF THE INVENTION

Fixed wireless telecommunications systems use transmitters and receivers to send and receive information over radio frequency signals in a network configuration. In some countries, such as the United States of America, the use of radio frequencies is highly regulated by governmental authorities. Entities desiring to transmit over these frequencies (e.g., radio stations, television stations, cellular telephone companies) must pay money to the government for such privilege.

Previously, bandwidth was widely available because the market for radio frequencies only constituted a limited number of entities. As more entities enter the field of telecommunications, however, the availability of frequencies for transmission decreases. In a fixed wireless local loop, multiple access over a given bandwidth provides a more efficient utilization of that bandwidth. Nonetheless, greater demands have made it increasingly more desirable to maximize the utility of any particular bandwidth for transmission. Prior systems and technologies utilizing radio frequencies have been unable to fully address the increased demands due to limitations associated with various factors, such a geographical concerns and limited support of modulation techniques.

SUMMARY OF THE INVENTION

An object of the present invention is to increase the amount of information which can be communicated through a particular frequency or range of frequencies over which a wireless telecommunications system operates. In one embodiment, this is accomplished in a fixed wireless local loop using code division multiple access (CDMA) and quadrature and amplitude modulation (QAM) techniques.

In accordance with one aspect of the present invention, a method is provided for increasing data throughput in a wireless telecommunications environment. The method includes the following steps: mapping a discrete bit sequence associated with a subscriber to an in-phase component and a quadrature component, the in-phase component and the quadrature component defining modulation of a radio frequency signal in phase and magnitude; and encoding the in-phase component and the quadrature component with a multiple access sequence associated with the subscriber.

In accordance with another aspect of the invention, an apparatus is provided for increasing data throughput in a wireless telecommunications environment. The apparatus includes a mapper which functions to map a discrete bit sequence associated with a subscriber to an in-phase component and a quadrature component. The in-phase component and the quadrature component define modulation of a radio frequency signal in phase and magnitude. A code multiplier unit is coupled to the mapper. The code multiplier unit encodes the in-phase component and the quadrature component with a multiple access sequence associated with the subscriber.

In accordance with a further aspect of the invention, a system is provided for increasing data throughput in a wireless telecommunications environment. The system includes a transmitter and a receiver. The transmitter is operable to map a discrete bit sequence associated with a subscriber to an in-phase component and a quadrature component which define modulation of a radio frequency signal in phase and magnitude. The transmitter combines the in-phase component and the quadrature component with a multiple access sequence associated with the subscriber. The receiver receives the radio frequency signal. The receiver integrates the in-phase component and the quadrature component over the multiple access sequence associated with the subscriber. Also, the receiver maps the in-phase component and the quadrature component to the discrete bit sequence.

The present invention provides various technical advantages over previous telecommunications systems and techniques. For example, one technical advantage is to increase the amount of information which can be transmitted through a particular frequency or range of frequencies. This may be accomplished utilizing a code division multiple access technique in which data for a particular subscriber is encoded with a code distinct to that subscriber. The encoded data is transmitted (along with similarly encoded data for other subscribers) in a radio frequency signal according to a quadrature and amplitude modulation technique. That is, the radio frequency signal is modulated in both phase and magnitude (i.e., quadrature and amplitude). Particular sets of quadrature and amplitude components define specific bit sequences.

Another technical advantage includes operating over multiple signal state constellations. Each signal state constellation may be a phase shift key (PSK), frequency shift key (FSK), or quadrature and amplitude modulation (QAM) constellation. The signal state constellations each may define a plurality of complex signal states. One signal state constellation defining relatively few signal states may be utilized during a handshake protocol in order to facilitate the establishment of a bidirectional link. Another signal state constellation defining a larger number of signal states can be utilized for transmission of data at a higher rate once communication has been established.

Other technical advantages are readily apparent to one skilled in the art from the following figures, description, and claims.

BRIEF DESCRIPTION OF THE DRAWINGS

An embodiment of the invention will be described hereinafter, by way of example only, with reference to the accompanying drawings in which like reference signs are used for like features and in which.

DETAILED DESCRIPTION OF THE INVENTION

Figure 1:
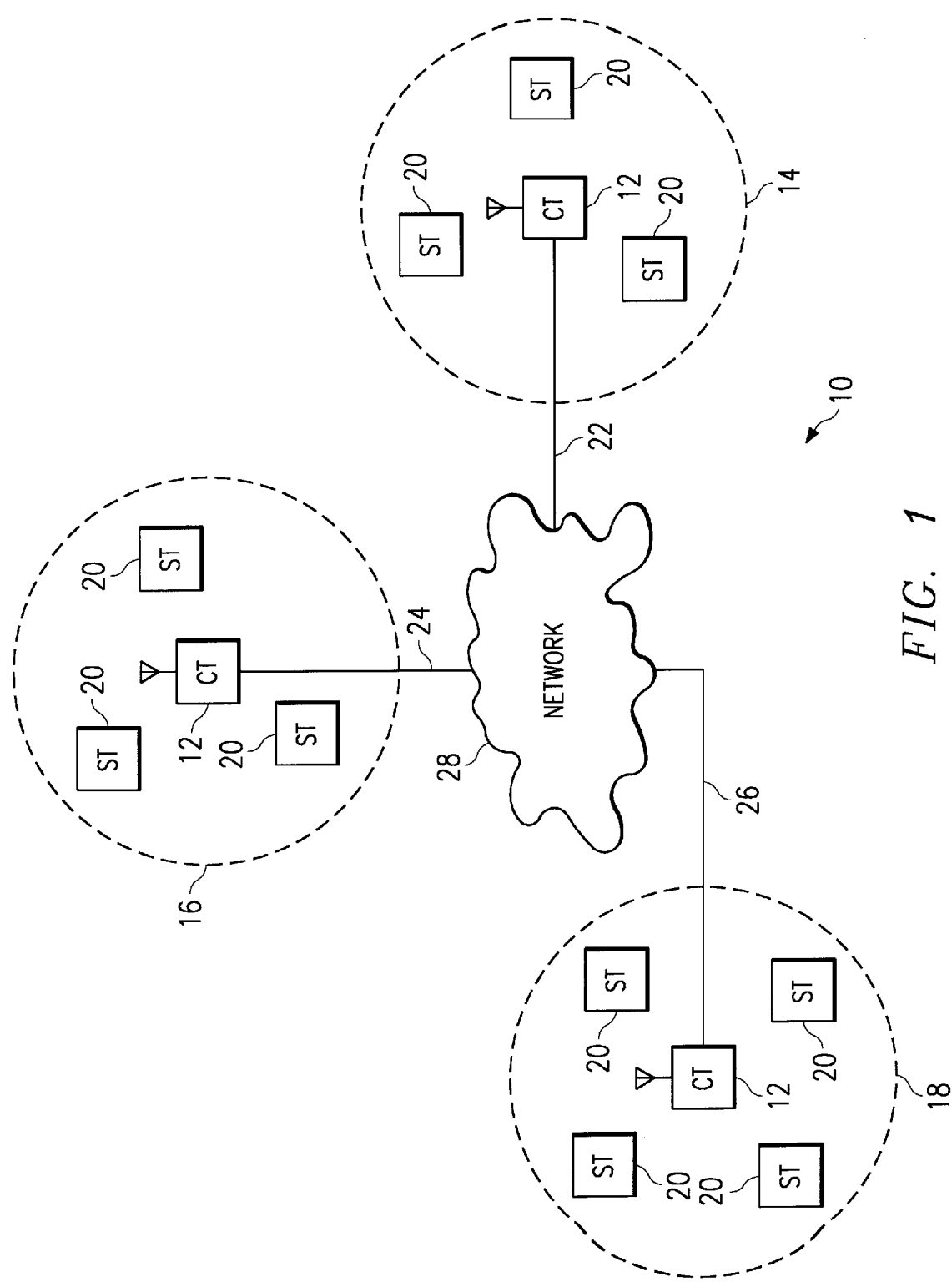
FIG. 1 is a schematic overview of an exemplary wireless telecommunications system into which the present invention can be included.

FIG. 1 is a schematic overview of an exemplary wireless telecommunications system 10 into which the present invention can be included. Telecommunications system 10 supports the transmission and reception of any form of information whether originally in analog or digital form, including voice, video, data, or other form of information.

Telecommunications system 10 includes one or more central terminals (CT) 12. Each central terminal 12 serves a respective service area, such as service areas 14, 16, and 18. Central terminals 12 for respective service areas 14, 16, and 18 can be connected to each other by means of links 22, 24, and 26, respectively, which interface, for example, with a public switched telephone network (PSTN) 28, other switched or dedicated networks, a local area network (LAN), a wide area network (WAN), or any other communication facilities. Each of links 22–26 can utilize conventional telecommunications technology, such as copper wires, optical fibers, satellites, and microwaves. Links 22–26 can support control, management, diagnostic, troubleshooting, and other suitable functions for a network of central terminals 12 in telecommunications system 10.

At least one subscriber terminal (ST) 20 may be located within each of service areas 14, 16, and 18. Subscriber terminals 20 are each associated with a particular subscriber of telecommunications system 10. Each subscriber terminal 20 may communicate over radio link with a respective central terminal 12 servicing the area in which the subscriber terminal 20 is located. It will be appreciated that the area covered by a particular central terminal 12 can be chosen to suit the local requirements of expected or actual subscriber density, local geographic considerations, etc. For example, in a rural area with a low density of subscribers, a service area 14 could cover an area with a radius of 15 to 20 kilometers. A service area 16 in an urban environment, in which there is a high density of subscriber terminals 20, might cover an area with a radius on the order of 100 meters. In a suburban area with an intermediate density of subscriber terminals 20, a service area 18 may cover an area with a radius on the order of 1 kilometer. The coverage in a particular service area 14–18 need not be, and typically will not be circular in extent due to antenna design considerations, geographical factors, man-made or natural structures and so on, which will affect the distribution of transmitted signals. Furthermore, although not explicitly shown in FIG. 1, the coverage of service areas may overlap in some cases.

Telecommunications system 10 is based on providing radio links between subscriber terminals 20 at fixed locations within a service area (e.g., 14, 16, and 18) and the central terminal 12 for that service area. In one embodiment, each subscriber terminal 20 is provided with a permanent fixed access link to its central terminal 12.

In another embodiment, demand-based access could be provided, so that the number of subscribers which can be serviced exceeds the number of telecommunications links which can currently be active. Concentration protocol techniques between each central terminal 12 and it corresponding subscriber terminals 20 are used to provide access on demand to a pool of available communication channels supported by a range of frequencies. Each central terminal 12 may operate on one of these frequencies using a plurality of multiple access sequences, the sequences being associated with specific subscribers as explained below in more detail.

The present invention contemplates that the range of frequencies supporting communication between central terminals 12 and their respective subscriber terminals 20 is limited. According to an embodiment of the present invention, the utility of this limited range of frequencies can be maximized by increasing the amount of data which can be transmitted therethrough. This may be accomplished utilizing a code division multiple access technique in which data for a particular subscriber is encoded with a code distinct to that subscriber. This data is transmitted (along with similarly encoded data for other subscribers) in a radio frequency signal according to a complex modulation technique. That is, the radio frequency signal is modulated in both phase and magnitude (i.e., in-phase and quadrature signal components). A bit sequence of one or more bits is mapped to a set of phase and magnitude components (i.e., polar coordinates) or in-phase and quadrature components (i.e., Cartesian coordinates). The bit sequences may correspond to complex signal states on one or more signal constellations. Exemplary signal processing stages for performing the coding, modulation, demodulation, and decoding of the present invention are illustrated and described below with reference to FIGS. 2 and 3. Exemplary complex signal constellations are shown and described with reference to FIGS. 4A–4F.

Figure 2:
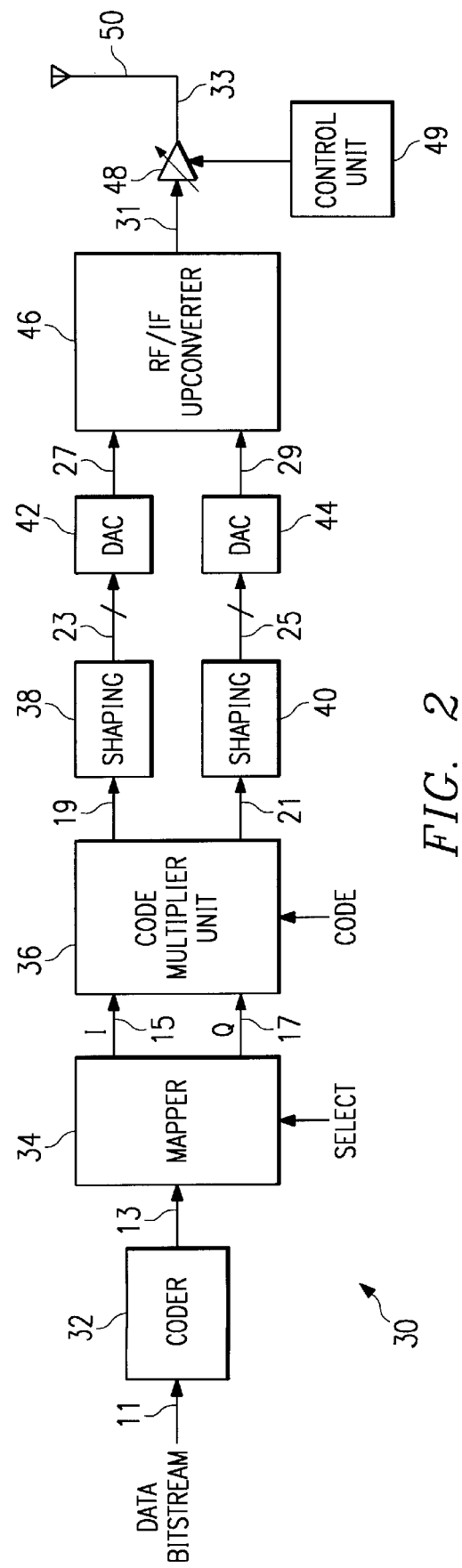
FIG. 2 is a schematic diagram illustrating a transmitter for the telecommunications system of FIG. 1.

FIG. 2 is a schematic diagram illustrating a transmitter 30 as configured in a subscriber terminal 20 of telecommunications system 10 shown in FIG. 1. Each central terminal 12 may also include a similar transmitter. Generally, transmitter 30 may perform encoding, multiplexing, modulation, protocol conversion, amplification, device or network interfacing, transmission, or any other suitable processing or function to transmit information. As shown, transmitter 30 comprises an encoder 32, a mapper 34, a code multiplier unit 36, shaping filters 38 and 40, digital to analog converters (DAC) 42 and 44, upconverter 46, a variable gain amplifier (VGA) 48, a control unit 49, and a transmitting antenna 50.

Coder 32 may receive a data bitstream 11 associated with a particular subscriber. Data bitstream 11 can support voice, data, video, or any other information, and may be input into coder 32 at an initial data rate $R_0$. Coder 32 may perform any of a variety of coding techniques, including scrambling, end coding, block coding, convolutional coding, and encryption, upon the data bitstream. Coder 32 can also add overhead information, such as one or more bits to support forward error correction (FEC), to data the bitstream. Coder 32 outputs a coded data bitstream 13 at a data rate $R_1$, which may be equal to or higher than $R_0$ based on the processing performed.

Mapper 34, coupled to coder 32, receives coded data bitstream 13. Mapper 34 incrementally divides coded data bitstream 13 into discrete sequences, each of which contains the same number (N) of data bits. Each of the discrete N-bit sequences may be represented by, or correspond to, one of $2^N$ complex signal states—i.e., S0, S1, S2, S3, etc.—disposed on a phase shift key (PSK), frequency shift key (FSK), quadrature amplitude modulation (QAM), or any other suitable constellation. Each complex signal state can be defined by a particular set of Cartesian coordinates comprising an in-phase (I) component and a quadrature (Q) component for the constellation. One of ordinary skill in the art would recognize that each complex signal state may also be represented by polar coordinates comprising a phase component and a magnitude component. Mapper 34 functions to map each discrete data sequence to baseband signals 15 and 17 for its corresponding in-phase and quadrature components. Both the in-phase and quadrature component baseband signals 15 and 17 can be formatted as sign magnitude or twos complement digital words. Because of the mapping operation, mapper 34 outputs data at a slower rate than that at which it is input. More specifically, this rate may be $R_1/N$.

Mapper 34, and thus transmitter 30, may operate over multiple constellations, wherein each constellation is associated with a particular size of bit sequence. For example, one constellation may support bit sequences having four bits, whereas another bit sequence may support bit sequences having five bits. The number of possible signal states in each constellation is equal to $2^N$, where N represents the number of bits in the associated sequences. For example, if N=2, the total number of possible states in an associated constellation is $2^2=4$; likewise, if N=4, the total number of possible states is $2^4=16$. Furthermore, each constellation may have its own average power or modulus level. Exemplary constellations are illustrated and explained below in more detail with reference to FIGS. 4A–4F. Mapper 34 may receive a select signal which selects the constellation over which mapper 34 operates.

It should be understood that the rate at which mapper 34 outputs data will vary depending upon the number of possible complex signal states in a constellation. Alternately, for a given symbol rate, user data rate can be increased or decreased. Thus, constellations which have more signal states provide increased communication or transmission capacity for a given bandwidth.

Code multiplier unit 36 is coupled to mapper 34, for example, by a bus wide enough to deliver the digitally encoded values of baseband in-phase and quadrature components in parallel. Code multiplier unit 36 receives the in-phase and quadrature component baseband signals 15 and 17 generated by mapper 34. Code multiplier unit 36 supports a code division multiple access (CDMA) operation whereby a channel frequency can be used to support multiple subscribers. In particular, code multiplier unit 36 performs a spreading function by multiplying each of the in-phase and quadrature component baseband signals with one or a combination of Walsh codes, Gold codes, pseudo-random noise (PN) codes, or other suitable code sequences. The codes may also comprise or be combined with suitable spreading sequences. For each subscriber within a coverage area, the set of codes will be distinct so that the signals of the subscriber can be distinguished from the signals of other subscribers, thereby allowing simultaneous communication of multiple subscribers.

In one embodiment, the in-phase and quadrature component baseband signals are encoded into a 160 ksymbols/s baseband signal. These signals are then spread by a factor of sixteen using a respective Walsh pseudo-random noise (PN) code spreading function to generate baseband signals at an effective chip rate of 2.56 Msymbols/s in 3.5 MHZ. Walsh codes are a mathematical set of sequences that have the function of "orthonormality" when all codes are properly aligned in time. In other words, if any Walsh code is multiplied by any other Walsh code, the results are theoretically zero. Although in actual implementation time offsets, distortions, and power offsets create residual access noise which ultimately effect both capacity and quality of service of a system, those skilled in the art understand how to minimize such effects. Consequently, the signals for respective subscribers do not interfere with each other. Because of the spreading feature, the rate at which data is output by code multiplier unit 36 is greater than the rate at which it receives data. More specifically, this rate may be represented by $R_1/(N \times SPREAD)$, where SPREAD equals the spreading factor.

Shaping filters 38 and 40 are coupled to code multiplier unit 36. Shaping filters 38 and 40 function to both bandlimit a signal and lower adjacent channel output for efficient use of spectrum. Shaping filter 38 operates upon a spread in-phase component baseband signal 19 output by code multiplier unit 36. Shaping filter 40 operates upon a spread quadrature component baseband signal 21 output by code multiplier unit 36. Shaping filters 38 and 40 function to provide pulse shaping of the associated component baseband signal 19, 21 in order to meet spectral requirements, thereby optimizing signal level versus noise. Each of shaping filters 38 and 48 may be implemented as a finite impulse response (FIR) filter, or alternatively, as a look-up table implementation. Shaping filters 38 and 40 output shaped baseband signals 23 and 25 corresponding to corresponding to the in-phase and quadrature components of the complex signal state.

Digital-to-analog (DAC) converters 42 and 44 are coupled to shaping filters 38 and 40, respectively. Digital-to-analog converter 42 functions to convert shaped baseband signal 23 (corresponding to the in-phase component) into a continuous analog voltage signal 27 proportional to the value set for that component by mapper 34. Likewise, digital-to-analog converter 44 functions to convert shaped baseband signal 25 (corresponding to the quadrature component) into a continuous analog voltage signal 29 proportional to the value set by mapper 34.

An upconverter 46 is coupled to digital-to-analog converters 42 and 44. Upconverter 46 receives the analog voltage signals 27 and 29 corresponding to the in-phase and quadrature components. The in-phase and quadrature components are combined and converted to intermediate (IF) and/or radio frequency (RF) for transmission. That is, upconverter 46 impresses the analog voltages for the in-phase and quadrature components upon a single carrier (e.g., VCO, sine, cosine, dual heterodyne wave). Accordingly, the carrier wave is modified by the phase and magnitude defined by the in-phase and quadrature components. It should be noted that in the embodiment implemented in a central terminal 12, such an upconverter includes a summer for in-phase components and a summer for quadrature components to be added together to create a composite signal of all the code division multiple access channels for a given frequency.

Variable gain amplifier 48 is coupled to upconverter 46 and control unit 49. Control unit 49, which can be implemented as a digital signal processor (DSP), a central processing unit (CPU), a micro controller, or any other suitable processor, generates control signals. Variable gain amplifier 48 receives the controls signals and the signal 31 output by upconverter 46. Variable gain amplifier 48 adjusts signal 31, in response to the control signals, to produce an amplified signal 33 having an average modulus. The power of the amplified signal 33 can be adjusted on a per subscriber basis or, alternatively, on the basis of all subscribers for which signals are output.

In an alternative embodiment, upconverter 46 and variable gain amplifier 48, as described above, can be replaced with a digital intermediate frequency upconverter, a variable gain amplifier, and a separate radio frequency upconverter coupled in cascading arrangement. One of ordinary skill in the art would understand that the output of this alternative embodiment would be the same as that of the embodiment illustrated and described with reference to FIG. 2.

Referring again to FIG. 2, transmitting antenna 50 is coupled to variable gain amplifier 48. Transmitting antenna 50 is operable to transmit amplified signal 33 output by variable gain amplifier 48. In one embodiment, transmitting antenna 50 is directional to define a maximum cone or geometric spread of transmission.

Figure 3:
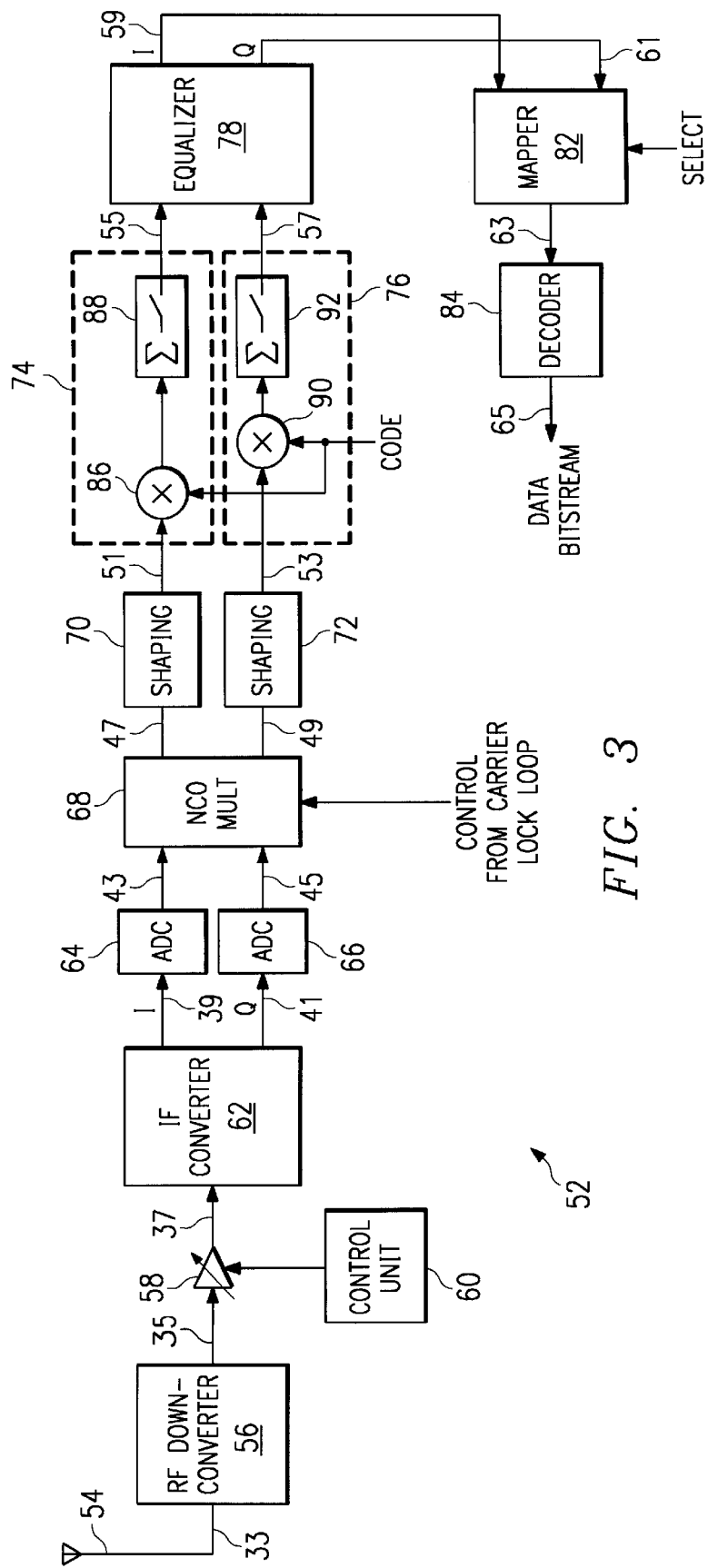
FIG. 3 is a schematic diagram illustrating a receiver for the telecommunications system of FIG. 1.

FIG. 3 is a schematic diagram illustrating a receiver 52 as configured in a subscriber terminal 20 in telecommunications system 10 of FIG. 1. Generally, receiver 52 may perform decoding, demultiplexing, demodulation, protocol conversion, amplification, device or network interfacing, reception, or any other suitable processing or function to receive information. Central terminals 12 may also be configured to perform equivalent signal reception processing. As shown, receiver 52 includes a reception antenna 54, a radio frequency (RF) downconverter 56, a variable gain amplifier (VGA) 58, a control unit 60, an intermediate frequency (IF) converter 62, analog-to-digital converters (ADC) 64 and 66, a numerically controlled oscillator (NCO) multiplier 68, shaping filters 70 and 72, correlators 74 and 76 (representing a bank of similar correlators), an equalizer 78, a mapper 82, and a decoder 84.

Reception antenna 54 generally functions to receive signals at one or more radio frequencies. In particular, reception antenna 54 may receive an analog signal 33 generated by a transmitter 30 such as shown and described with reference to FIG. 2. In one embodiment, reception antenna 54 is directional to define a maximum cone or geometric spread of reception.

Radio frequency downconverter 56, coupled to reception antenna 54, converts such radio frequency analog signal 33 into an intermediate frequency signal 35.

Variable gain amplifier 58 is coupled to radio frequency downconverter 56 and control unit 60. Control unit 60 generates one or more control signals which are input into variable gain amplifier 58. Like transmitter 30, receiver 52 operates over multiple constellations, wherein each constellation has an average power or modulus level. The average modulus level for a constellation is defined by the following equation:

$$\sum_{i=1}^{N} \frac{(I_i^2 + Q_i^2)^{1/2}}{N}$$

where "$I_i$" and "$Q_i$" represent the in-phase and quadrature components, respectively, of the "ith" signal state of the constellation. In response to the control signals, variable gain amplifier 58 amplifies intermediate frequency analog signal 35 to produce an amplified analog signal 37. The control signals "tune" variable gain amplifier 58 to an average modulus level for incoming analog signal 35. The average modulus level may indicate a particular constellation of complex signal states (e.g., S0, S1, S2, etc.).

Intermediate frequency converter 62, coupled to variable gain amplifier 58, receives amplified analog signal 37. Intermediate frequency converter 62 downconverts amplified analog signal 37 at intermediate frequency. Intermediate frequency converter 62 also separates analog signal 37 into two voltage signals 39 and 41 corresponding to the in-phase and quadrature components, respectively. The in-phase and quadrature components define a particular signal state in the constellation to which variable gain amplifier 58 has tuned. Resultant voltage signals 39 and 41 may include residual carrier.

Analog-to-digital converters 64 and 66 receive analog output signals 39 and 41 from intermediate frequency converter 62. Analog-to-digital converter 64 converts analog signal 39 (corresponding to the in-phase component) into a digitally formatted signal 43. Similarly, analog-to-digital converter 66 converts analog signal 41 (corresponding to the quadrature component) into a digitally formatted signal 45. Digitally formatted signals 43 and 45 may each comprise a plurality of bits.

Numerically controlled oscillator multiplier 68 is coupled to analog-to-digital converters 64 and 66. Numerically controlled oscillator multiplier 68 performs a frequency translation down to baseband. More specifically, numerically controlled oscillator multiplier 68 multiplies digitally formatted signals 43 and 45 with appropriate sine or cosine signals in order to remove residual carrier. This produces baseband signals 47 and 49 for the in-phase and quadrature components, respectively. Numerically controlled oscillator multiplier 68 may receive control signals from a carrier lock loop circuit or from an appropriate control unit.

In an alternative embodiment, intermediate frequency converter 62, analog-to-digital converters 64 and 66, and numerically controlled oscillator multiplier 68 can be replaced with an analog-to-digital converter and a digital intermediate frequency converter (which includes a numerically controlled oscillator and a downsampler) coupled in cascading arrangement. One of ordinary skill in the art would understand that the output of this alternative embodiment would be the same as that of the embodiment illustrated and described with reference to FIG. 3.

Shaping filters 70 and 72 are coupled to numerically controlled oscillator multiplier 68. Each of shaping filters 70 and 72 can be implemented as a finite impulse response filter. Shaping filters 70 and 72 optimize signal-to-noise ratio and minimize inter-symbol interference (ISI) in baseband signals 47 and 49, which results in shaped signals 51 and 53, respectively.

A bank of correlators is coupled to shaping filters 70 and 72. For clarity, the bank of correlators is represented by exemplary correlators 74 and 76, and hereinafter, references to these correlators 74 and 76 are intended to mean a bank of correlators. Correlator 74 comprises a multiplier 86 and a summer 88. Likewise, correlator 76 comprises a multiplier 90 and a summer 92. Correlators 74 and 76 integrate the shaped in-phase and quadrature component signals 51 and 53 over a code, which is received at multipliers 86 and 90. As previously stated, different codes, which can be one or a combination of pseudo-random noise (PN) codes, Walsh codes, Gold Codes, spreading sequences, or other suitable sequences, are associated with different subscribers. For a particular subscriber, the code input into correlators 74 and 76 is the same as that used for encoding the subscriber link. In one embodiment, correlators 74 and 76 may each be implemented as a Walsh correlator. Correlators 74 and 76 output in-phase component signal 55 and quadrature component signal 57, respectively. It should be understood that a bank of correlators similar to correlators 74 and 76 may be provided in order to provide signal acquisition and tracking functions in receiver 52.

Equalizer 78 is coupled to correlators 74 and 76. Equalizer 78 functions to remove degradations in in-phase component signal 55 and quadrature component signal 57. Equalizer 78 generates signals 59 and 61, and may output data at a rate of $R_1/N$, which is defined above in the description of transmitter 30 shown in FIG. 2.

Mapper 82 is coupled to equalizer 78. Mapper 82 operates over multiple constellations, where each constellation may have an associated average modulus and comprises a different number of complex signal states (e.g., S0, S1, S2, etc.). At any given moment, the operating constellation for mapper 82 is determined by the average modulus set by variable gain amplifier 58 and control unit 60. The average modulus can be translated to a select signal which is received by mapper 82. Mapper 82 maps each set of in-phase and quadrature component signals 50 and 61 to a discrete sequence of N data bits. This sequence corresponds to the complex signal state defined by the in-phase and quadrature components for the operating constellation. It should be understood that in an alternate embodiment, receiver 52 may operate in polar coordinates (i.e., phase and magnitude), in which case mapper 82 maps the polar coordinates to an appropriate sequence of data bits. Mapper outputs the discrete sequences of data bits in a coded data bitstream 63 at a rate of $R_1$.

Decoder 84 is coupled to mapper 82. Decoder 84 performs decoding upon coded data bitstream 63 output by mapper 82. This decoding may include unscrambling, decryption, extraction of overhead information (e.g, forward error correction data) and any other of a variety of decoding techniques. Decoder 84 outputs a data bitstream 65, which may be the same as the data bitstream 11 that was previously input into a corresponding transmitter 30 (FIG. 2).

In operation, with reference to FIGS. 1–3, one or more transmitters 30 at respective subscriber terminals 20 in a coverage area may each receive a data bitstream for the respective subscriber. Each of the transmitters 30 processes the data bitstream which it receives. In particular, in each transmitter 30, the respective data bitstream is incrementally divided into discrete bit sequences, where each bit sequence corresponds to a complex signal state defined by a particular combination of in-phase and quadrature components. The bit sequences are mapped to appropriate in-phase and quadrature components, which are then coded with a code distinct to the subscriber of the particular subscriber terminal 20. The baseband signal for the subscriber is upconverted. That is, the in-phase and quadrature components are impressed upon a carrier wave, which is then transmitted at a radio frequency. At the same time, similar baseband signals (comprising in-phase and quadrature components) for other subscribers are impressed upon carrier waves and transmitted at the same radio frequency.

A receiver 52 in the central terminal 12 receives the signals from the various subscriber terminals 20 located within the coverage area served by the central terminal 12. The receiver 52 downconverts the various signals from the radio frequency at which the signals were broadcast. Two signals are generated: a first signal comprising the in-phase components for all subscribers and a second signal comprising the quadrature components for all subscribers. A separate receiver 52 or a separate set of correlators, such as correlators 74 and 76, is provided for each subscriber in the service area. Each set of correlators multiplies the two generated signals with the pseudo-random noise codes for the respective subscriber in order to distinguish the baseband signal for that subscriber. Each baseband signal can be mapped in order to obtain the data sequence originally input into the transmitter 30 for the respective subscriber terminal 20.

It should be understood that data can also be transmitted from a transmitter 30 of a central terminal 12 and received by a receiver 52 of one or more subscriber terminals 20 in like manner.

Accordingly, by encoding data for a particular subscriber with a code distinct to that subscriber, and then transmitting the encoded data (along with similarly encoded data for other subscribers) in a radio frequency signal that is modulated in both quadrature and amplitude (i.e., phase and magnitude), the present invention maximizes the utility of a limited range of frequencies to increase the data throughput.

FIGS. 4A–4F illustrate exemplary quadrature and amplitude (QAM) modulation constellations which may be utilized in the transmission and reception of signals in telecommunications system, such as in exemplary transmitter 30 and receiver 52. As shown, all of these quadrature and amplitude modulation constellations comprise circular signal constellations. Generally, each of the constellations comprises a number of complex signal states (e.g., S0, S1, S2, S3, etc.). Each complex signal state is defined by a particular in-phase component (horizontal axis) and quadrature component (vertical axis). The complex signal states are disposed or located upon one or more amplitude rings.

Each complex signal state may correspond to a specific sequence of data bits. Gray coding techniques can be used to define the sequences represented by respective signal states so that only one bit will vary between the sequences for adjacent states on each constellation. In this manner, the impact of incorrectly interpreting a complex signal state from the in-phase and quadrature components is reduced. For a particular constellation, the number of data bits within a sequence is directly related to the number of complex signal states in that constellation, as illustrated below. Accordingly, the rate at which data bits can be transmitted increases in relationship to the number of signal states contained in a constellation.

Figure 4A:
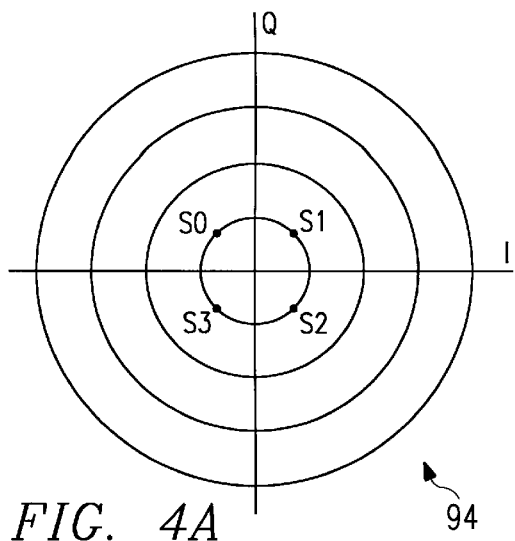
FIGS. 4A–4F are graphical depictions of exemplary signal constellations utilized in the telecommunications system shown in FIG. 1.

Referring to FIG. 4A, a constellation 94 having four complex signal states is shown. These signal states, labeled as S0–S3, are located on a single amplitude ring corresponding to a specific modulus. As such, constellation 94 constitutes a four phase shift key (PSK) constellation because phase, but not magnitude, is modulated between signal states. Each complex signal state S0–S3 represents a specific two bit sequence.

Figure 4B:
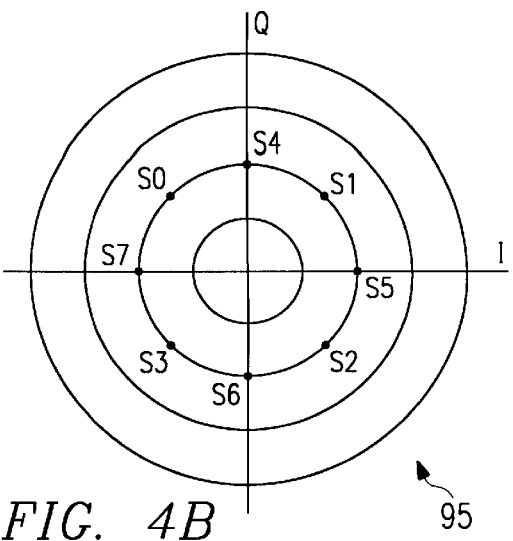

FIG. 4B illustrates a PSK constellation 95 having eight complex signal states. These signal states, labeled as S0–S7, are located on a single amplitude ring corresponding to a specific modulus. Each complex signal state S0–S7 in eight PSK constellation 95 represents a different three bit sequence.

Figure 4C:
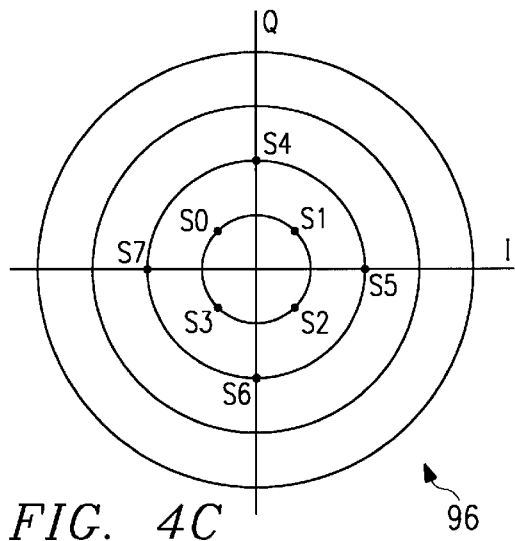

FIG. 4C illustrates an eight quadrature and amplitude modulation (QAM) constellation 96. That is, constellation 96 comprises eight complex signal states, which are labeled as S0–S7. These complex signal states are located on two amplitude rings. An average modulus for this constellation 96 lies between the two amplitude rings. Each complex signal state S0–S7 represents a different three bit sequence.

Figure 4D:
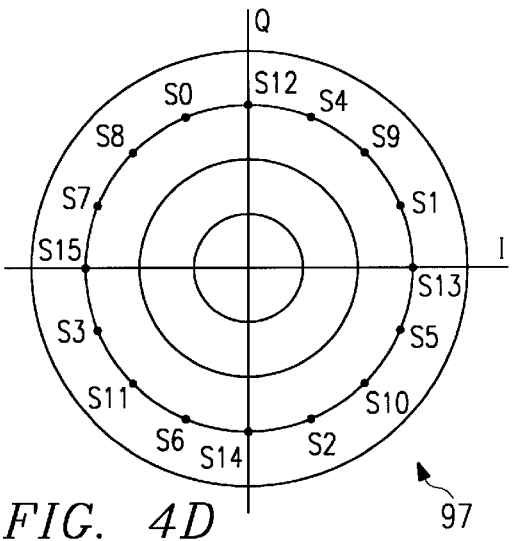

FIG. 4D illustrates a sixteen PSK constellation 97 comprising sixteen complex signal states S0–S15 disposed on a single amplitude ring. The modulus for sixteen PSK constellation 97 coincides with this amplitude ring. Each complex signal state S0–S15 may represent a different four bit sequence.

Figure 4E:
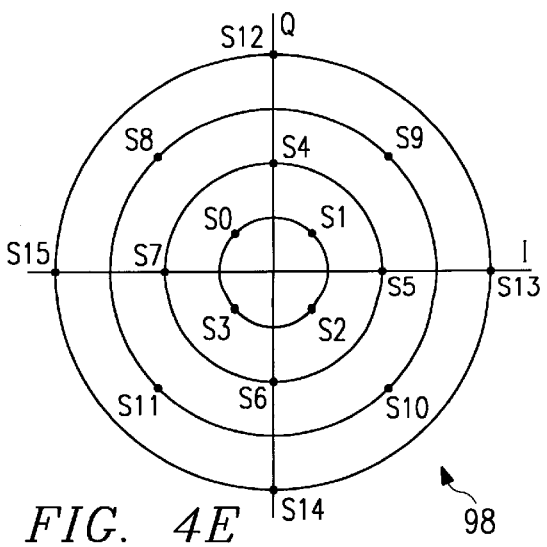

FIG. 4E illustrates a sixteen QAM constellation 98 comprising sixteen complex signal states S0–S15 disposed on four amplitude rings. An average modulus for constellation 98 lies between the innermost and outermost rings. Each complex signal state S0–S15 may represent a different four bit sequence.

Figure 4F:
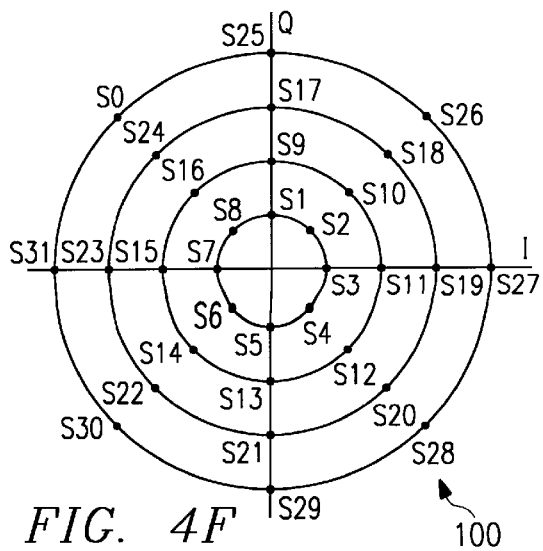

FIG. 4F illustrates a thirty two QAM constellation 100 comprising thirty two complex signal states, S0–S31, located on four amplitude rings. An average modulus for constellation 100 lies between the innermost and outermost amplitude rings. Each of the complex signal states S0–S31 corresponds to a different four bit sequence.

During the operation of telecommunications system 10, the constellations 94–100 illustrated in FIGS. 4A–4F can be utilized at various points in time in order to perform various functions. For example, a simpler constellation (i.e, one comprising a fewer number of signal states and perhaps a single amplitude ring) may be used during a handshake protocol, thereby facilitating the establishment of a bidirectional link. A more complex constellation (i.e., one comprising more signal states and perhaps multiple amplitude rings) can be used for transmission at a higher data rate once communication has been established.

Figure 5:
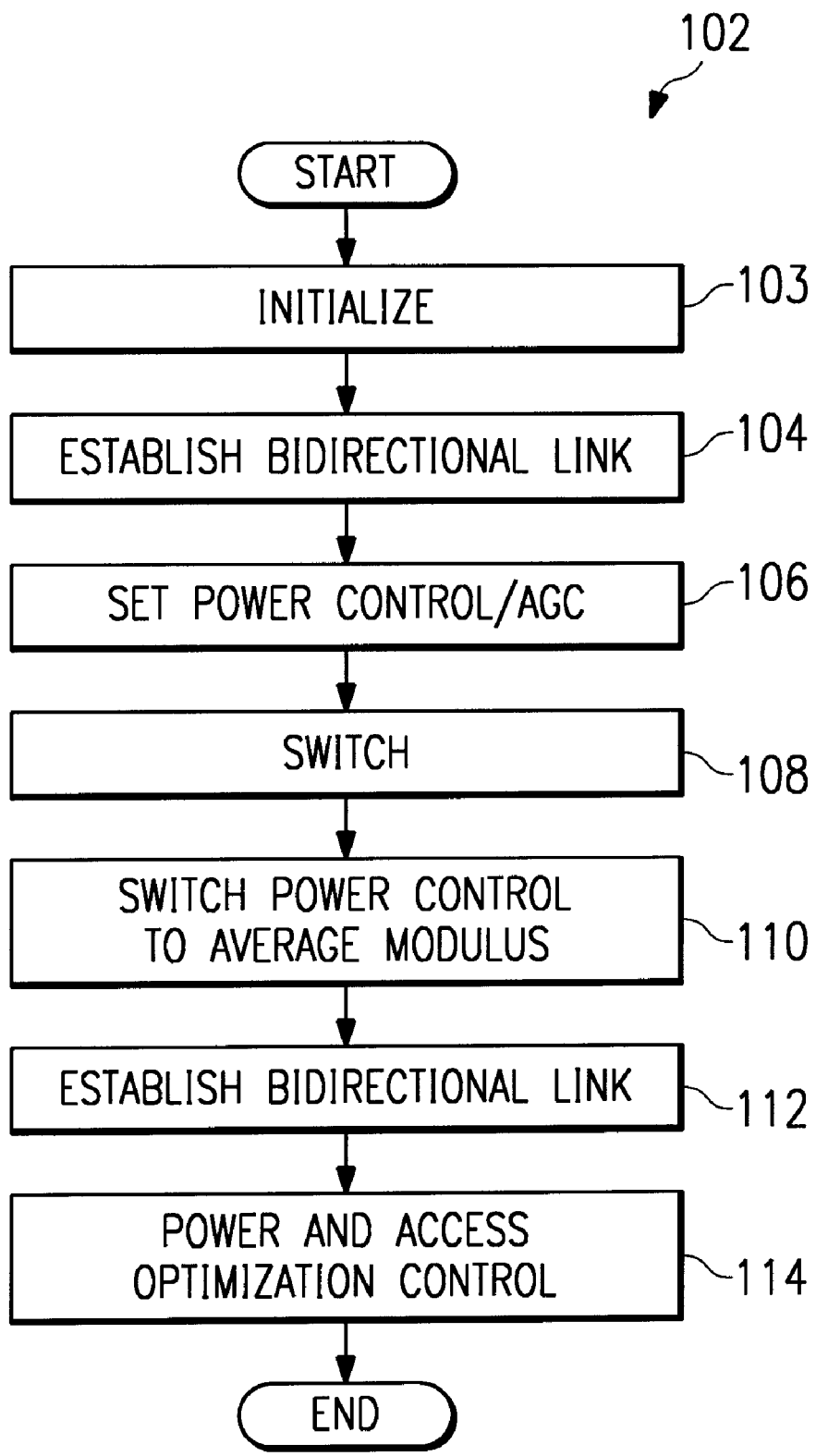
FIG. 5 is a flow diagram of a protocol for communication in the telecommunications system shown in FIG. 1.

FIG. 5 is a flow chart of a protocol 102 for communication in telecommunications system 10 shown in FIG. 1. Protocol 102 begins at step 103 where a transmitter 30 and a receiver 52 both initialize for operation using complex signal states of a constellation having a single amplitude ring, such as PSK constellation 94 shown in FIG. 4A. Data is transmitted at a lower rate for this constellation.

At step 104, a bidirectional link is established between the transmitter 30 and the receiver 52. This is accomplished by performing both code and power alignment—i.e., aligning the code in time and making them equivalent power. Information continues to be transmitted at the lower rate using the complex signal states of the single amplitude ring (e.g, PSK) constellation. At step 106, power controls for each of the transmitter 30 and receiver 52 are set to operate at the power modulus corresponding to the amplitude ring of the constellation.

At step 108, operation is switched to a constellation having increased signal states, such as any of the exemplary phase shift key (PSK) or quadrature and amplitude modulation (QAM) constellations 94–100 shown in FIGS. 4B–4F, respectively. The multiple amplitude ring constellation may have an average power modulus that differs from the power modulus of the PSK constellation. At step 110, the power controls for the transmitter 30 and receiver 52 are switched to operate at the average modulus of the multiple amplitude ring constellation.

At step 112, a bidirectional link is established in which the complex signal states of the multiple amplitude ring constellation are utilized. This constellation has more complex signal states than the single amplitude ring constellation and, accordingly, data is transmitted at a higher rate for the multiple amplitude ring constellation. Protocol 100 then ends.

At step 114, power and access optimization control is performed. That is, additional processing of power levels may be performed to vary the expected average modulus of higher density, more complex constellations with respect to simpler constellations. This provides equivalent error rates for all subscribers in a coverage area.

For example, for a given frequency and coverage area in which a family of multiple access codes is used to provide access to a pool of subscriber terminals 20, each subscriber terminal 20 may operate at one of a number of different rates (e.g., 32 kbit/s ADPCM voice, 64 kbit/s PCM toll-quality voice, 144 kbit/s ISDN in formatted 2B+D, fractional or full T1 or E1, etc.), thus supporting different grades of service to the associated subscribers. Based on the load and quality of service, both signal level and the number of available multiple access channels can be optimized to meet minimum quality of service customer requirements, where quality of service is defined by a average bit error rate (BER) at a given receive data rate.

The balance of these functions is performed by the central terminal 12 and provided over the radio control to the subscriber terminals 20. Global optimization across all users in a given frequency band and family of codes allows for optimum use of the spectrum in combination with demand access or fixed access techniques.

Although the present invention and its advantages have been described in detail, it should be understood that various changes, substitutions, and alterations can be made herein without departing from the spirit and scope of the invention as defined by the appended claims.

What is claimed is:

1. A method for increasing data throughput in a wireless telecommunications environment, comprising:

receiving a select signal;

receiving a data bit stream associated with a subscriber, partitioning the data bit stream into a plurality of discrete bit sequences, each of the plurality of discrete bit sequences having a same selected number of data bits according to the select signal;

selecting one of a plurality of complex signal constellations according to the select signal, each complex signal constellation including a plurality of complex signal states; and mapping each of the plurality of discrete bit sequences to a corresponding one of the plurality of complex signal states in the selected complex signal constellation.

2. The method of claim 1, further comprising:

mapping each discrete bit sequence of the data bit stream to an in-phase component and a quadrature component, the in-phase component and the quadrature component defining modulation of a radio frequency signal in phase and magnitude.

3. The method of claim 2, further comprising:

adjusting a power level of the radio frequency signal to an average modulus level of the selected complex signal constellation.

4. The method of claim 1, further comprising:

selecting a first complex signal constellation for operation during a handshake protocol to establish a link; and selecting a second complex signal constellation for operation after the link has been established.

5. The method of claim 4, wherein the first complex signal constellation has a first number of complex signal states and the second complex signal constellation has a second number of complex signal states, the second number being greater than the first number.

6. The method of claim 2, further comprising adjusting a power level of the radio frequency signal to an average modulus.

7. The method of claim 2, further comprising encoding the in-phase component and the quadrature component with a multiple access sequence associated with the subscriber.

8. The method of claim 7, wherein the multiple access sequence comprises:

a Walsh specific to the subscriber; and a pseudo-random noise code.

9. An apparatus for increasing data throughput in a wireless telecommunications environment, the apparatus comprising:

a mapper operable to receive a select signal, the mapper operable to receive a data bit stream associated with a subscriber, the mapper operable to partition the data bit stream into a plurality of discrete bit sequences each having a same selected number of bits according to the select signal, the mapper operable to operate over any of a plurality of complex signal constellations, each complex signal constellation including a plurality of complex signal states, the mapper operable to map each of the plurality of discrete bit sequence to a corresponding one of the plurality of complex signal states of a particular complex signal constellation selected according to the select signal; and a code multiplier unit coupled to the mapper, the code multiplier unit operable to encode each of the mapped discrete bit sequences with a multiple access sequence associated with the subscriber.

10. The apparatus of claim 9, further comprising an upconverter coupled to the code multiplier unit, the upconverter operable to upconvert the encoded mapped discrete bit sequences to a radio frequency signal for transmission.

11. The apparatus of claim 9, further comprising a variable gain amplifier coupled to the code multiplier unit, the variable gain amplifier operable to adjust a power level of the radio frequency signal to an average modulus.

12. The apparatus of claim 9, wherein the multiple access sequence comprises:

a Walsh specific to the subscriber; and a pseudo-random noise code.

13. The apparatus of claim 9, wherein the mapper is operable to dynamically select the complex signal constellation over which the mapper operates.

14. The apparatus of claim 9, wherein the mapper is further operable to a mapper operable to map each discrete bit sequence associated with a subscriber to an in-phase component and a quadrature component, the in-phase component and the quadrature component defining modulation of a radio frequency signal in phase and magnitude.

15. The apparatus of claim 14, wherein the code multiplier unit is operable to perform a code division multiple access technique upon the in-phase component and the quadrature component.

16. The apparatus of claim 9, further comprising:

a first digital to analog converter coupled to the code multiplier unit, the first digital to analog converter operable to generate a first analog voltage signal from the in-phase component;

a second digital to analog converter coupled to the code multiplier unit, the second digital to analog converter operable to generate a second analog voltage signal from the quadrature component.

17. The apparatus of claim 16, further comprising an upconverter, the upconverter operable to impress the first and second analog voltage signals upon a carrier wave.

18. A system for increasing data throughput in a wireless telecommunications environment, the system comprising:

a transmitter operable to receive a data bit stream associated with a subscriber, the transmitter operable to partition the data bit stream into a plurality of discrete bit sequences each having a same dynamically selected number of bits, the transmitter operable to operate over any of a plurality of complex signal constellations, each complex signal constellation including a plurality of complex signal states, the transmitter operable to map each of the plurality of discrete bit sequences to a corresponding one of the plurality of complex signal states of a particular complex signal constellation dynamically selected according to the dynamically selected number of bits of each discrete bit sequence, the transmitter operable to incorporate the mapped discrete bit sequences into a radio frequency signal; and a receiver operable to receive the radio frequency signal, the receiver operable to unmap the mapped discrete bit sequences to extract the plurality of discrete bit sequences therefrom, the receiver operable to reproduce the data bit stream from the plurality of discrete bit sequences for transfer to the associated subscriber.

19. The system of claim 18, wherein the transmitter is operable to map each discrete bit sequence of the data bit stream to an in-phase component and a quadrature component which define modulation of the radio frequency signal in phase and magnitude, the transmitter operable to combine the in-phase component and the quadrature component with a multiple access sequence associated with the subscriber.

* * * * *